Dec. 29, 1959   M. P. BAKER   2,919,150
BALL JOINT ASSEMBLIES
Filed Feb. 15, 1955

INVENTOR.
MAX P. BAKER
BY
HIS ATTORNEY

United States Patent Office 2,919,150
Patented Dec. 29, 1959

2,919,150

BALL JOINT ASSEMBLIES

Max P. Baker, Dayton, Ohio, assignor to General Motors Corporation, Detroit, Mich., a corporation of Delaware Application February 15, 1955, Serial No. 488,289

6 Claims. (Cl. 287—90)

This invention relates to universal joints and in particular to ball and joint assemblies adapted for use in steering mechanisms of automobiles.

It is an object of this invention to provide a ball and joint assembly having a non-metallic moldable support interposed in the space between the ball and socket which is provided with an internal configuration whereby the support offers more resistance to an axial rotation than a rocking of the ball.

It is a further object of this invention to provide a ball and joint assembly having a support of nylon, phenolic resin or other suitable high impact moldable non-metallic material interposed between the ball and the socket which is provided with internal raised portions formed by molding the support about a ball having flat portions thereon and turning the ball stud axially relative to the support so that the internal raised portions of the support bear against spherical portions of the ball whereby the support offers greater resistance to an axial rotation than a rocking of the ball stud.

Yet another object of this invention is to provide a method of making a ball and joint assembly wherein a moldable non-metallic relatively high impact material is molded directly about the ball of a ball stud which is then secured in a socket member.

It is still another object of this invention to provide a method of making a ball and joint assembly which offers greater resistance to an axial rotation than a rocking of the ball stud which consists in providing a ball of a ball stud with flat portions, positioning the ball in the socket, molding a support of a resilient high impact, moldable, non-metallic material in the space between the ball and the socket and turning the ball axially of the stud a predetermined amount.

A ball and socket joint constructed in accordance with the above objects has many advantages over presently known ball joints. As will be seen, its structure is relatively simple eliminating the need for springs and the like for holding the ball positioning in the socket with a desired degree of tightness. Its manufacture is relatively simple and less costly. Furthermore, it is sturdy, durable and self-lubricating and requires no maintenance after installation. Since the support is molded directly about the ball, the tolerances between the support and the ball are very close and a predetermined frictional resistance to movement between the parts results, thus eliminating in operation the squeaks and groans attending various presently known devices. A suitable non-metallic moldable material such as nylon or high impact phenolic resin composition, when used in a ball and joint assembly, also results in a joint having a large capacity to absorb shock.

In some uses, as for example, in steering mechanisms of automobiles where a steering mechanism tie-rod is connected to a front wheel suspension, it is desirable that the ball joint allows an easy rocking motion corresponding to the flexing motion of the suspension due to road conditions, but that it imposes relatively more resistance to a rotation of the ball stud corresponding to a movement of the steering mechanism so as to provide a smooth and consistent steering motion.

Further objects and advantages of the present invention will be apparent from the following description, reference being had to the accompanying drawings wherein preferred embodiments of the present invention are clearly shown.

In general, the present invention comprises providing a support between a socket and the ball of a ball stud disposed therein of a moldable non-metallic relatively high impact material and means cooperating with the support whereby the ball will turn in the support relatively easily in one direction and less easily in another.

In a preferred embodiment the invention comprises in providing one or more flat or depressed portions, preferably in opposed relation on the ball of a ball stud which is disposed in a socket, providing a support molded about the ball and filling the space between the ball and socket of a high impact, nonmetallic moldable material such as nylon or a fiber filled phenolic resin. In the molding process, raised portions are formed in the internal surfaces of the molded support corresponding to the flat or otherwise depressed portions of the ball. The ball is then forcibly rotated within the support axially with respect to the stud whereby the raised portions of the support bear against spherical portions of the ball with the result that the ball stud will rock relatively easily about the raised portion or portions of the support but will encounter considerably more resistance to axial rotation relative thereto.

Figure 1:
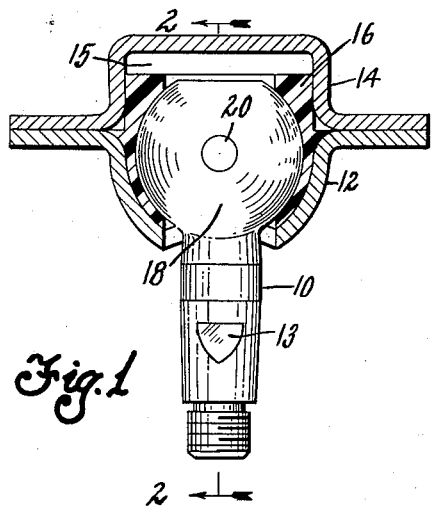
Figure 1 is a cross sectional side view of an asesmbled ball and joint made in accordance with the present invention.

One type of ball and joint constructed in accordance with the present invention is shown in the drawings. Figure 1 shows a ball and joint having a ball stud 10, a socket member consisting of a lower portion 12 and an upper portion 14, and a moldable non-metallic support or insert 16 molded about the ball 18 and disposed in the space between the ball and the socket members. The ball 18 is provided with flat portions 20 which may be more clearly seen in reference to Figure 2.

Figure 2:
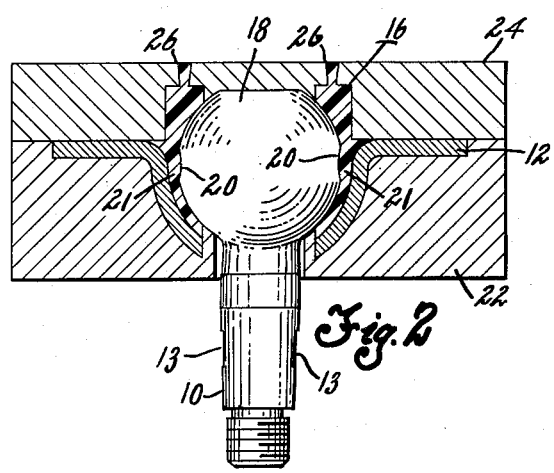
Figure 2 is a cross sectional side view taken along plane 2—2 of Figure 1 of the support molded about a ball stud in a mold apparatus.

The support 16 may be molded about the ball 18 in one type of mold as shown in Figure 2. A drag or lower mold portion 22 is adapted to hold lower socket portion 12 and has a cylindrical upwardly extending portion adapted to hold the ball in fixed position with respect to lower socket member 12 and prevent the escape of molding material during the molding process. A cope or upper mold portion 24 having a cavity of suitable configuration and molding material injection apertures 26 are fitted over lower mold portion 22. As indicated above, ball 18 is provided with flats 20 which in this particular embodiment are disposed in opposed relation on a line passing through the center of ball 18 and being perpendicular to the longitudinal axis of stud 10. The molding composition is injected through apertures 26 and raised flat portions are formed on the curved internal surface of resulting support 16 corresponding to flat portions 20 of the ball. The integrally formed lower socket portion 12, support 16 and ball 18 are removed from the mold, the support 16 is trimmed as may be necessary and the top socket portion 14, Figure 1, is placed over the support 16 and secured to lower socket portion 12 by any suitable means, as, for example, by spot welding, to form a ball socket assembly as shown in Figure 1. Cavity 15 may be filled with a lubricant to insure smooth functioning of the joint.

Figure 5:
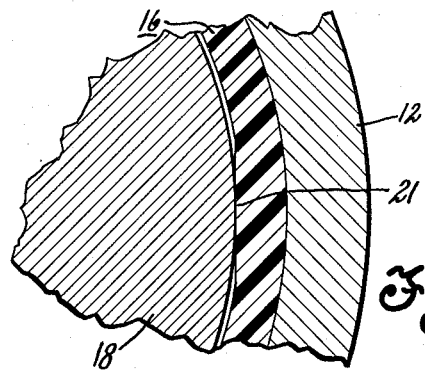
Figure 5 is a cross sectional fragmentary view of the portion of a ball joint showing in greater detail the configuration of the support with respect to the ball.
Figure 3:
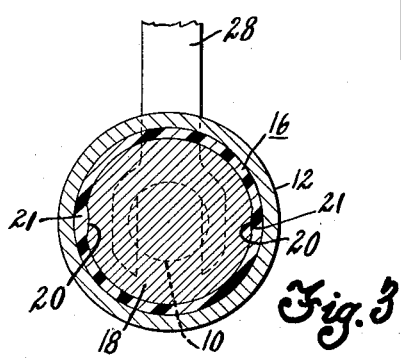
Figure 3 is a cross sectional top view taken along a horizontal plane through the center of the ball.
Figure 6:
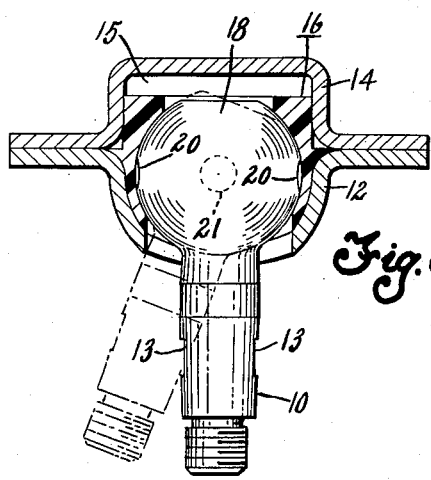
Figure 6 is a cross sectional side view of the ball joint in completed form.
Figure 4:
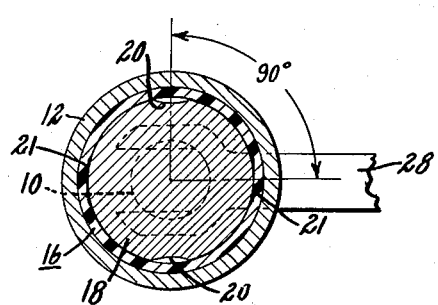
Figure 4 is the view shown in Figure 3 after the ball has been rotated 90° with respect to the support.

As shown in Figures 1 and 2, stud 10 is provided with flat portions or index points 13 to locate the position of flat portions 20 of the ball and to afford a means of forcibly turning the ball within support 16. The ball 18 as shown in Figure 3 is forcibly rotated axially of stud 10 about 90° as shown in Figure 4 by means of a wrench 28 or any suitable device whereby the raised portions of the support 16 bear against spherical portions of ball as shown in detail in Figure 5. As shown in Figure 6, the ball stud 10 will rock readily about an axis passing through the raised portions 21 of the support 16. It is obvious that raised portions 21 of the support 16 will offer substantially more resistance to an axial rotation of the ball stud. The depth of flats 20 depends on the elastic properties of the support 16 and upon the degree of resistance to axial rotation of the ball stud desired.

Although the invention has been described in terms of a specific embodiment, various modifications may be made to better suit a particular application. For example, the flats of the ball or corresponding raised portions of the support may be located at various points depending on the operating position of the ball joint. In some applications a single raised portion in the support surface may be adequate whereby more resistance is offered to one type of movement of the ball as compared to another. Further, although the ball joint assembly shown is formed with the aid of a mold it is obvious that the support may be modified and formed in situ by injection of the molding material directly through an aperture in an assembled ball and socket.

Other means may be used to effect raised portions on internal surfaces of the support. For example, suitably located ridges or raised portions may be provided on internal surfaces of the socket, and the support member having the ball embedded therein may be forcibly and compressibly disposed in the socket whereby the raised portions of the socket cause corresponding raised portions on the internal surfaces of the support.

The moldable non-metallic composition contemplated herein may be any moldable material having relatively high impact properties and durability. The use of nylon compositions of the type disclosed in U.S. applications, Serial Nos. 488,187 (now Patent No. 2,879,091) and 488,216, both filed February 15, 1955, and high impact fiber filled phenolic compositions have been found particularly suitable for the application indicated herein. Other materials such as suitable polytetrafluoroethylene materials, urea resins, etc. may also be used.

While the embodiments of the present invention as herein disclosed constitute preferred forms, it is to be understood that other forms might be adopted.

What is claimed is as follows:

1. A ball and joint assembly comprising in combination a stud having a ball at one end thereof, said ball having flat portions disposed on opposite surfaces located substantially by a line passing through the center of said ball and being perpendicular to the longitudinal axis of said stud, a socket receiving said ball, an insert of moldable non-metallic relatively high impact material filling the space between said ball and said socket, internal raised portions on said insert complementary in shape to said flat portions of said ball, said ball being orientated with respect to said insert so that the raised portions of said insert bear against spherical portions of said ball and yieldably resist certain relative movements between the ball and insert which is fixed against movement relative to said socket through said ball is relatively easily pivotable relative to an axis through said internal raised portions.

2. Claim 1 wherein said insert is composed of nylon.

3. Claim 1 wherein said insert is composed of thermosetting, fiber reinforced, high impact phenolic resin.

4. A ball and joint assembly comprising in combination a stud having a ball at one end thereof, a socket receiving said ball, an insert of moldable relatively high impact resistant material having internal and external surfaces interposed between said ball and said socket, and a pair of diametrically-opposite inwardly-extending portions integral with and formed in raised relation to the internal surface of said insert, said external surface of said insert having a shape substantially complementary to said socket relative to which said insert is fixed and anchored against rotation of said insert, said pair of raised portions engaging said ball at locations in an axis substantially transverse to said stud whereby rocking and pivoting of said stud about this axis necessarily encounters less resistance to movement than there is in opposition to turning of said stud axially relative to itself and said fixed insert in any direction other than as a rocking and pivoting movement in the axis defined by said pair of radially inwardly-extending raised portions though damage-free movement is possible even against the greater resistance.

5. A ball and joint assembly, comprising in combination a stud having a longitudinal axis and having a ball at one end thereof which is provided with a substantially spherical outer periphery, a socket receiving said ball, an insert of moldable relatively high impact resistant material having internal and external surfaces interposed between said ball and said socket, a pair of opposite depressed portions disposed on the periphery of said ball in locations at a predetermined distance from each other on a line passing through the center of said ball and being perpendicular to the longitudinal axis of said stud, and a pair of diametrically-opposite inwardly-extending portions integral with and formed in raised relation to the internal surface of said insert, said external surface of said insert having a shape substantially complementary to said socket relative to which said insert is fixed and anchored against rotation of said insert, said pair of raised portions having a shape initially complementary to said opposite depressed portions and engaging said ball at locations which are angularly displaced from said opposite depressed portions and which are also in an axis substantially transverse to said stud whereby rocking and pivoting of said stud about this axis necessarily encounters less resistance to movement than there is in opposition to turning of said stud axially relative to itself and said fixed insert in any direction other than as a rocking and pivoting movement in the axis defined by said pair of radially inwardly-extending raised portions though damage-free movement is possible even against the greater resistance.

6. The ball and joint assembly of claim 5 wherein said stud has flat index portions to locate positioning of said pair of opposite depressed portions of said ball and to afford a means of forcibly turning the ball within said insert.

References Cited in the file of this patent

UNITED STATES PATENTS

| | | |
|---|---|---|
| 892,105 | White | June 30, 1908 |
| 2,100,642 | Geyer | Nov. 30, 1937 |
| 2,252,351 | Paulus | Aug. 12, 1941 |
| 2,288,160 | Flumerfelt | June 30, 1942 |
| 2,292,675 | Thiry | Aug. 11, 1942 |
| 2,444,121 | Venditty | June 29, 1948 |
| 2,462,138 | Spangenberg | Feb. 22, 1949 |
| 2,715,766 | Ricks | Aug. 23, 1955 |
| 2,755,116 | Alldredge | July 17, 1956 |